United States Patent [19]

Morimoto et al.

[11] Patent Number: 5,086,145
[45] Date of Patent: Feb. 4, 1992

[54] METHOD OF MANUFACTURING SOLVENT-SOLUBLE POLYORGANOSILSESQUIOXANES

[75] Inventors: Takashi Morimoto; Hiroshi Yoshioka, both of Tokyo, Japan

[73] Assignee: Shin-Etsu Chemical Co., Ltd., Tokyo, Japan

[21] Appl. No.: 539,486

[22] Filed: Jun. 18, 1990

[30] Foreign Application Priority Data

Jun. 16, 1989 [JP] Japan ................................. 1-153885

[51] Int. Cl.$^5$ ............................................. C08G 77/06
[52] U.S. Cl. ........................................ 528/14; 528/21; 528/29; 556/462; 556/470
[58] Field of Search ........................ 528/14, 29, 21; 556/462, 470

[56] References Cited

U.S. PATENT DOCUMENTS

| | | | |
|---|---|---|---|
| 4,399,266 | 8/1983 | Matsumura | 528/14 |
| 4,467,081 | 8/1984 | Chang et al. | 556/462 |
| 4,528,390 | 7/1985 | Kimura | 528/21 |

Primary Examiner—Melvyn I. Marquis
Assistant Examiner—Margaret W. Glass
Attorney, Agent, or Firm—Millen, White & Zelano

[57] ABSTRACT

Disclosed is a method of manufacturing solvent-soluble polyorganosilsesquioxanes of the formula;

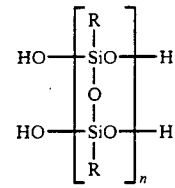

wherein each R is a substituted or unsubstituted alkyl, alkenyl or halogen-substituted alkyl group of 1-5 carbon atoms, or substituted or unsubstituted phenyl of 6-10 carbon atoms, and n is 2-10,000; which comprises reacting an organotriacetoxysilane with a stoichiometric quantity of alcohol and/or water in an organic solvent to obtain a diacetoxymonoalkoxysilane, which is condensation polymerized in the presence of sodium hydrogencarbonate to obtain a prepolymer, which prepolymer is then condensation polymerized by heat in the presence of a catalyst selected from alkali metal hydroxides, alkaline earth metal hydroxides, alkali metal fluorides, alkaline earth metal fluorides and triethylamine.

16 Claims, No Drawings

METHOD OF MANUFACTURING SOLVENT-SOLUBLE POLYORGANOSILSESQUIOXANES

FIELD OF THE INVENTION

This invention relates to a method of manufacturing polyorganosilsesquioxanes useful as resist materials and heat-resistant coating materials, and more particularly to a manufacturing method suitable for mass production of solvent-soluble polyorganosilsesquioxanes.

BACKGROUND OF THE INVENTION

Polyorganosilsesquioxanes with a regular ladder structure, due to their excellent plasma-resistant and heat-resistant properties, have conventionally been considered to be useful as, for example, resist materials and heat-resistant coating properties. Of these polyorganosilsesquioxanes having a ladder structure, those having aryl or alkyl groups are synthesized according to various methods. In one such method, a polyorganosilsesquioxane compound with for example aryl groups such as phenyl or toryl, or higher alkyl groups such as isobutyl or isoamyl, and which is soluble in organic solvents, is synthesized by hydrolysis and condensation polymerization of an organotrichlorosilane with said organic groups in an organic solvent at a low temperature (J. Amer. Chem. Soc., Vol. 82, P 6194 (1960), J. Polymer Sci. Vol C-1 P. 83 (1963)). In another method, a soluble polyorganosilsesquioxane with $C_1$–$C_3$ lower alkyl groups is synthesized by hydrolysis and condensation polymerization of an organotrichlorosilane at the interface between an aqueous layer and an organic layer (Unexamined Japanese Patent Application (Japanese Patent Kokai) No. 50-111198).

Also, Japanese Patent Kokai No. 62-16212 discloses the synthesis of a high molecular weight polyorganosilsesquioxane with lower alkyl groups by hydrolysis of an organotrichlorosilane at the interface between an aqueous layer and an organic layer followed by condensation polymerization under an inert gas at high pressure.

In this case, the reactivity of the organotrichlorosilane in the hydrolysis reaction is very high. The reaction may therefore be controlled by carrying out the above hydrolysis either at low temperature and/or at the interface between the two layers, and cage-type prepolymers such as $T_6$, $T_8$ and $T_{10}$ having regular structures with considerable distortion are synthesized. These cage-type prepolymers are then heated to induce condensation polymerization, while maintaining regular structures and synthesize polyorganosilsesquioxanes with a regular ladder type structure.

In the above method, however, because the hydrolysis of the above organotrichlorosilane has to be carried out under controlled conditions at low temperature, there is a risk of overrun and the method is not suited to mass production.

The present inventors carried out intensive studies to overcome these problems and found that the desired polyorganosilsesquioxanes with a regular ladder structure could be easily mass produced from prepolymers synthesized by a heat-induced condensation polymerization of partially alkoxylated triacetoxysilanes in the presence of sodium hydrogencarbonate, and then carrying out a condensation polymerization of the prepolymers obtained in the presence of catalysts.

SUMMARY OF THE INVENTION

The object of the present invention is therefore to provide a suitable method for mass producing ladder-type soluble polyorganosilsesquioxanes.

The object of this invention is achieved by a method of manufacturing solvent-soluble polyorganosilsesquioxanes having the following general formula:

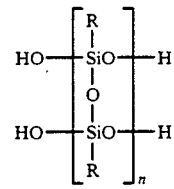

wherein R and n are as defined hereinafter, which method is characterized in that an organotriacetoxysilane and the stoichiometric quantity of alcohol and/or water are reacted together in an organic solvent to obtain a diacetoxymonoalkoxysilane which is condensation polymerized in the presence of sodium hydrogencarbonate to obtain a prepolymer, and this prepolymer is then condensation polymerized by heat in the presence of at least 1 type of catalyst chosen from alkali metal hydroxides, alkaline earth metal hydroxides, alkali metal fluorides, alkaline earth metal fluorides, and triethylamine.

According to the present invention, the desired ladder type solvent-soluble polyorganosilsesquioxane can be mass-produced easily since the process to prepare thereof can be controlled easily.

DETAILED DESCRIPTION OF THE INVENTION

In the general formula (I), R is at least 1 type of substituted or unsubstituted hydrocarbon group chosen from univalent alkyl groups, alkenyl groups or halogen-substituted alkyl groups with 1–5 carbon atoms, or univalent substituted or unsubstituted phenyl groups with 6–10 carbon atoms, R' is at least 1 type of functional group chosen from hydrogen atoms, organic groups, organosilyl groups or organopolysiloxysilyl groups, and n lies in the range 2–10,000.

The organotriacetoxysilanes which are the starting material of this invention may be represented by the general formula $RSi(OCOCH_3)_3$. In this formula, R is at least 1 type of group selected from alkyl groups with 1–5 carbon atoms, alkenyl groups, halogen-substituted alkyl groups, or substituted or unsubstituted phenyl groups with 6–10 carbon atoms. Examples of such groups are methyl, ethyl, propyl, butyl, vinyl, allyl, homoallyl, chloromethyl, chloropropyl, phenyl, o, m or p-acetylphenyl, methoxyphenyl, ethoxyphenyl, trimethylsiloxyphenyl and chloromethylphenyl.

The partial alkoxylation of said triacetoxysilanes may easily be carried out by reacting them with the molar equivalent of a monohydric alcohol and/or water. Specific monohydric alcohols that can be used in this reaction are methanol, propanol, isopropanol and butanol, any one of these being used alone or 2 or more being used in combination.

Said partial alkoxylation reaction is carried out by dripping a monohydric alcohol and/or water into triacetoxysilane or a mixture of triacetoxysilane and solvent with stirring, and ageing the reaction mixture.

There is no particular restriction on the reaction solvent provided it has no reactivity with respect to triacetoxysilane, alcohol or water, but can however dissolve them. In this regard, preferred solvents are acetone, methyl ethyl ketone, methyl isobutyl ketone, benzene, toluene, xylene, n-hexane, diethyl ether, tetrahydrofuran and dioxane. The reaction may be carried out at room temperature, but it may be heated in order to increase the reaction rate. The heating temperature is preferably 30°-140° C. and more preferably 60°-120° C., in which case the reaction is complete in 30 min-10 hours. The reaction product thereby obtained consists mainly of diacetoxymonoalkoxysilane as principal component, but it also contains small amounts of unreacted triacetoxysilane and monoacetoxydialkoxysilane as side products.

The diacetoxymonoalkoxysilane which is the desired product may be separated and purified by distillation, but there is usually no problem if it is taken to the next process without removing the above side products, and this is also advantageous from the viewpoint of cost.

Next, the diacetoxymonoalkoxysilane thus obtained is condensation polymerized with sodium hydrogencarbonate in the proportion of 1.5-4.5 moles with respect to 1 mole of diacetoxymonoalkoxysilane in an organic solvent to convert it to a ladder type prepolymer. The solvent used here is typically the same as that used for said monoalkoxylation. The reaction temperature may be conveniently chosen within the range 40°-140° C., and more preferably within the range 80°-120° C. Within this temperature range, the reaction is completed within 3-10 hours.

The resulting ladder type prepolymer is then condensation polymerized in an organic solvent in the presence of a catalyst to obtain the desired solvent-soluble polyorganosilsesquioxane. The organic solvent used is typically the same as that used in said monoalkoxylation and prepolymer synthesis steps.

The catalyst may be an alkali metal hydroxide such as potassium hydroxide or lithium hydroxide, an alkali metal fluoride such as lithium fluoride or cesium fluoride, or triethylamine, but the most preferable catalyst is potassium hydroxide. Further, the quantity of catalyst is in the range 0.0005-0.1 mole per 1 mole of silicon atoms in the prepolymer, but is more preferably 0.0015-0.05.

The reaction temperature may be chosen in the range 0°-200° C., but it is preferably in the range 20°-100° C. Within this temperature range, the desired quantity of target compound is normally obtained within 30 min-5 hours.

As described in detail above, according to this method, there is no risk of overrun in any of the reaction processes. It is therefore possible to control the reaction easily, and the desired ladder type solvent-soluble polyorganosilsesquioxane can be mass-produced easily.

EXAMPLES

This invention is described in more detail by means of the following examples, however it should be understood that the invention is in no way limited to them.

EXAMPLE 1

Manufacture of Prepolymer 220 g of methyl triacetoxysilane (1 mole) and 220 g of methyl isobutyl ketone were introduced into a 2 l four-necked flask equipped with a stirrer, thermometer, reflux condenser and dropping funnel. After dripping in 46 g (1 mole) of ethyl alcohol with stirring while maintaining a temperature of 60° C., the temperature was increased to 100° C. and stirring was continued for 1 hour to synthesize an diacetoxymonoalkoxysilane. Next, the reaction system was allowed to cool to room temperature, and dripped into a 2 l four-necked flask previously equipped with a stirrer, thermometer, condenser and dropping funnel containing 400 g of methyl isobutyl ketone and 252 g (3 mole) of sodium hydrogencarbonate. The temperature was raised to 100° C., and a condensation polymerization was carried out while continuing stirring for 3 hours. After the reaction was complete, the reaction mixture was washed with water until the wash solution was neutral, and introduced into a 1 l four-necked flask equipped with a stirrer, thermometer, ester adaptor, condenser and nitrogen inlet tube. The temperature was then raised to 110° C. while introducing nitrogen gas and, after removing residual water by co-boiling, stirring was continued for 8 hours while maintaining the temperature at 100° C. so as to obtain a methyl isobutyl ketone solution of prepolymer.

The solvent was removed under reduced pressure from 100 g of this prepolymer solution, and a white solid was thus obtained in a yield of 20. 1 g. According to the molecular weight measurement by GPC, a number average molecular weight was 3,500 based on polystyrene.

Next, 100 g of said prepolymer solution was introduced into a 1 l four-necked flask equipped with stirrer, thermometer, condenser and dropping funnel, the temperature was raised to 60° C., 0.561 g of a 1 weight % methanol solution of potassium hydroxide was added, and stirring was continued for 1 hour while maintaining the temperature at 60° C. to carry out a condensation polymerization reaction.

After allowing to cool, 30 g of n-butyl acetate was added to the reaction mixture, and the mixture was washed with water until the wash solution was neutral. The reaction mixture was added to acetonitrile, the precipitate produced was filtered off, washed again with acetonitrile, and then dried under reduced pressure to obtain a white powder solid. Yield was 18.8 g. According to the molecular weight measurement by GPC, a number average molecular weight was 141,000 based on polystylene.

The infra-red absorption spectrum showed Si—O—Si antisymmetrical stretching vibration peaks characteristic of ladder type polysiloxanes (1090 cm$^{-1}$ and 1015 cm$^{-1}$). This product was easily soluble in benzene, toluene, ethyl acetate, n-butyl acetate, methyl ethyl ketone, methyl isobutyl ketone and cyclohexane. It was confirmed from the above physical properties and proton NMR measurements that this product was a ladder type polymethylsilsesquioxane:

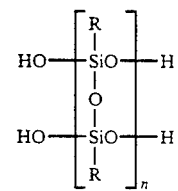

wherein R is CH$_3$ and n are integers from 500-10,000.

EXAMPLE 2

7.4 g (0.03 mole) of allyl triacetoxysilane, chloromethyltriacetoxysilane (0.07 mole) and 60 g of methyl isobutyl ketone were introduced into a glass reaction vessel equipped with stirrer, thermometer, condenser and dropping funnel, and 3.2 g (0.1 mole) of methanol were dripped in at 60° C. with stirring. After the addition and ageing the reaction mixture at 100° C. for 1 hour, it was cooled to room temperature. Next, this reaction mixture was dripped in at 60° C. with stirring into a similar glass reaction vessel already containing 25.2 g of sodium hydrogencarbonate and 50 g methyl isobutyl ketone. After the addition and ageing the reaction mixture at 100° C. for 3 hours, it was washed with water until the wash solution was neutral. This methyl isobutyl ketone solution was dried with anhydrous sodium sulfate, and methyl isobutyl ketone was distilled off in a rotary evaporator at 20 mm Hg and 60° C. to give 8.6 g of a light yellow powder solid prepolymer. According to the molecular weight measurement by GPC, a number average molecular weight of this substance was 1,320 based on polystyrene.

After dissolving 5.0 g of said prepolymer in 25 g of methyl isobutyl ketone, 0.5 g of trimethylamine was added, and a polymerization was carried out at 30° C. for 2 hours.

After the reaction, 30 g of methyl isobutyl ketone was added, the reaction mixture was washed with 5% aqueous hydrochloric acid, and then with water until the wash solution was neutral. Next, said methyl isobutyl ketone solution was dripped into 500 ml of methanol with stirring, the precipitate produced was filtered, and dried under reduced pressure to give 3.7 g of a light yellow powder solid.

According to the molecular weight measurement by GPC, a number average molecular weight of this solid was 24,500 based on polystyrene. It was confirmed from the infrared absorption spectrum and proton NMR that it was a ladder type polyallylchloromethylsilsesquioxane. This product was soluble in methyl ethyl ketone, methyl isobutyl ketone, cyclohexane, n-butyl sulfate, toluene and xylene.

What is claimed:

1. A method of manufacturing solvent-soluble polyorganosilsesquioxanes having the following general formula:

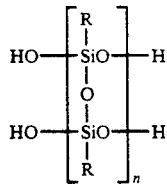

wherein each R is a substituted or unsubstituted hydrocarbon group selected from the group consisting of univalent alkyl groups, alkenyl groups and halogen-substituted alkyl groups of 1-5 carbon atoms, and univalent substituted or unsubstituted phenyl groups of 6-10 carbon atoms, and n lies in the range 2-10,000; which comprises reacting an organotriacetoxysilane with a stoichiometric quantity of an alcohol and/or water in an organic solvent to obtain a diacetoxymonoalkoxysilane, which is condensation polymerized in the presence of sodium hydrogencarbonate to obtain a prepolymer, and this prepolymer is then condensation polymerized by heat in the presence of at least one type of catalyst chosen from alkali metal hydroxides, alkaline earth metal hydroxides, alkali metal fluorides, alkaline earth metal fluorides, and triethylamine.

2. The method of manufacturing solvent-soluble polyorganosilsesquioxanes of claim 1, wherein the alcohol which reacts with organotriacetoxysilane is selected from the group consisting of methanol, propanol, isopropanol and butanol.

3. The method of manufacturing solvent-soluble polyorganosilsesquioxanes of claim 2, wherein said alcohol is methanol or ethanol.

4. The method of manufacturing solvent-soluble polyorganosilsesquioxanes of claim 1, wherein the organic solvent which is used in the reaction of organotriacetoxysilane with alcohol and/or water is selected from the group consisting of acetone, methylethylketone, methylisobutylketone, benzene, toluene, xylene, n-hexane, diethylether, tetrahydrofuran and dioxane.

5. The method of manufacturing solvent-soluble polyorganosilsesquioxanes of claim 1, wherein the reaction of organotriacetoxysilane with alcohol and/or water is carried out at 30°-140° C.

6. The method of manufacturing solvent-soluble polyorganosilsesquioxanes of claim 5, wherein said reaction is carried out at 60°-120° C.

7. The method of manufacturing solvent-soluble polyorganosilsesquioxanes of claim 1, wherein the thus-produced diacetoxymonoalkoxysilane is subjected to condensation polymerization without isolation or purification thereof.

8. The method of manufacturing solvent-soluble polyorganosilsesquioxanes of claim 1, wherein the sodium hydrogencarbonate is used in an amount of 1.5-4.5 moles with respect to 1 mole of diacetoxymonoalkoxysilane.

9. The method of manufacturing solvent-soluble polyorganosilsesquioxanes of claim 1, wherein the condensation polymerization of the diacetoxymonoalkoxysilane is carried out at 40°-140° C.

10. The method of manufacturing solvent-soluble polyorganosilsesquioxanes of claim 9, wherein the condensation polymerization of the diacetoxymonoalkoxysilane is carried out at 80°-120° C.

11. The method of manufacturing solvent-soluble polyorganosilsesquioxanes of claim 1, wherein the catalyst is potassium hydroxide.

12. The method of manufacturing solvent-soluble polyorganosilsesquioxanes of claim 1, wherein the catalyst is employed in an amount in the range 0.0005-0.1 mole per 1 mole of silicon atoms in the prepolymer.

13. The method of manufacturing solvent-soluble polyorganosilsesquioxanes of claim 12, wherein said quantity of catalyst is in the range 0.0015-0.05 mole.

14. The method of manufacturing solvent-soluble polyorganosilsesquioxanes of claim 1, wherein the condensation polymerization of the prepolymer is carried out at 0°-200° C.

15. The method of manufacturing solvent-soluble polyorganosilsesquioxanes of claim 14, wherein said condensation polymerization is carried out at 20°-100° C.

16. The method of claim 1, wherein the alcohol which reacts with the organotriacetoxysilane is methanol and the reaction is carried out at 60°-120° F.; wherein the condensation polymerization of the diacetoxymonoalkoxysilane is carried out at 40°-140° C. and the polymerization is carried out at 80°-120° C. employing 0.005-0.1 mole of an alkali metal hydroxide as the catalyst.

* * * * *